July 13, 1926.

F. J. BOWDEN

AUTOMOBILE ATTACHMENT

Filed Jan. 7, 1922

1,592,436

2 Sheets-Sheet 1

Inventor
FRANK J. BOWDEN
By
Ch. Darken Attorney

July 13, 1926. 1,592,436
F. J. BOWDEN
AUTOMOBILE ATTACHMENT
Filed Jan. 7, 1922 2 Sheets-Sheet 2
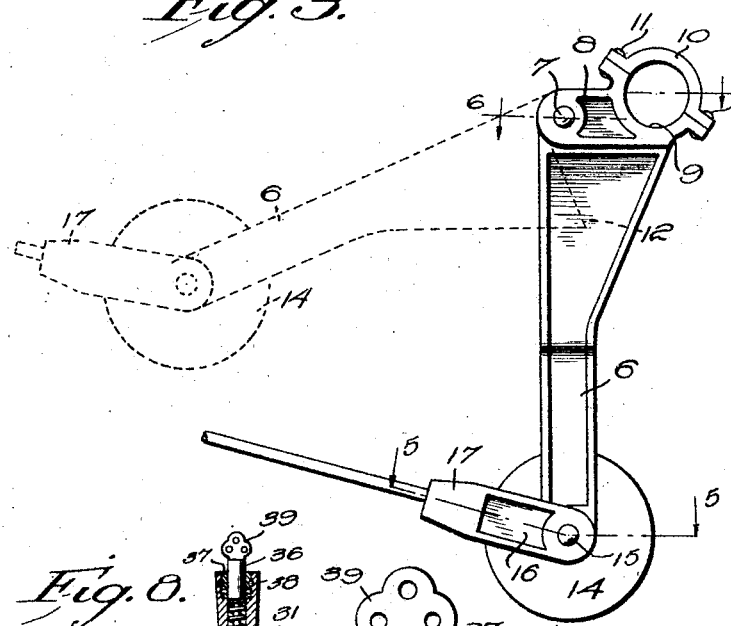
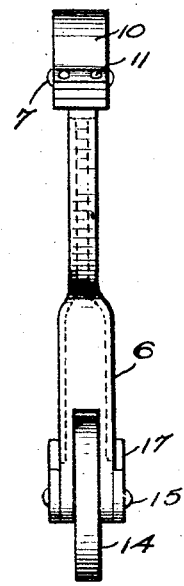
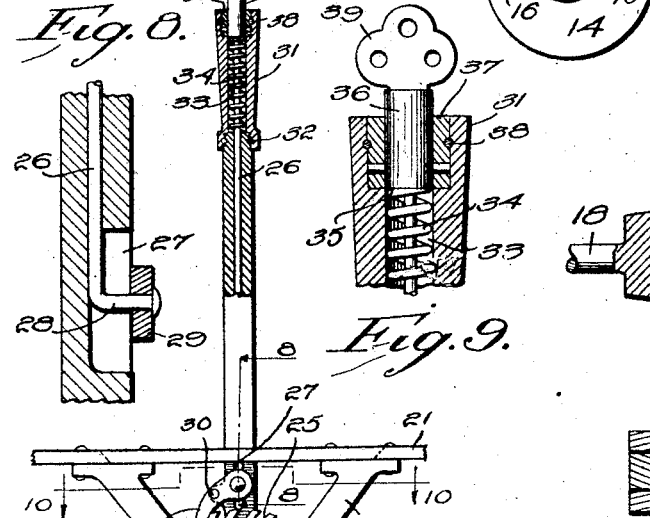
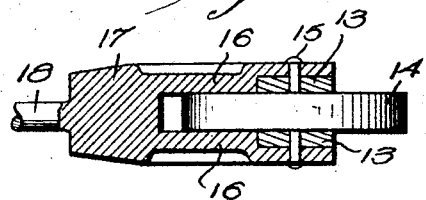
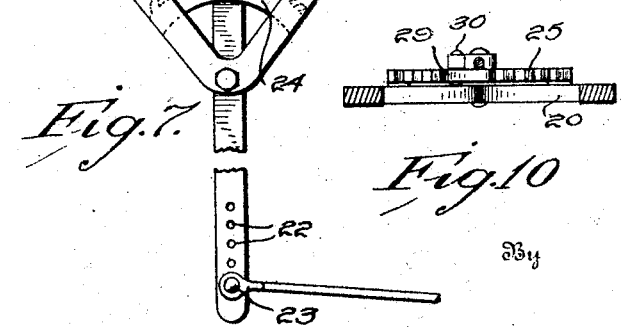
Inventor
FRANK J. BOWDEN
Attorney Patented July 13, 1926.

1,592,436

UNITED STATES PATENT OFFICE.

FRANK J. BOWDEN, OF NEW YORK, N. Y.

AUTOMOBILE ATTACHMENT.

Application filed January 7, 1922. Serial No. 527,786.

This mechanism relates to locking mechanism for motor vehicles, and more particularly to roller jacks adapted to be attached to the axle of a vehicle to permit the traction wheels to be raised out of engagement with the ground and locked in such position.

An object of the invention is to provide a jack attached to the rear axle by means of which the rear wheel may be raised to inoperative position.

A further object of the invention is the provision of operating means connected to the jack and extending to a point located near the driver's seat to permit operation of the jack from the driver's seat.

A further object is the provision of locking means to prevent the jack from being released by unauthorized persons.

Figure 1:
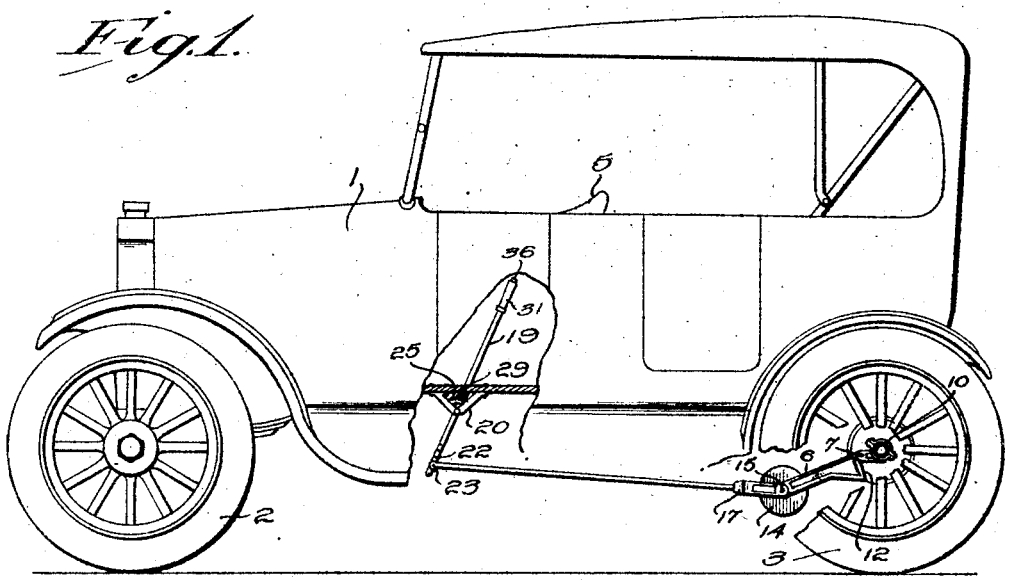
Figure 2:
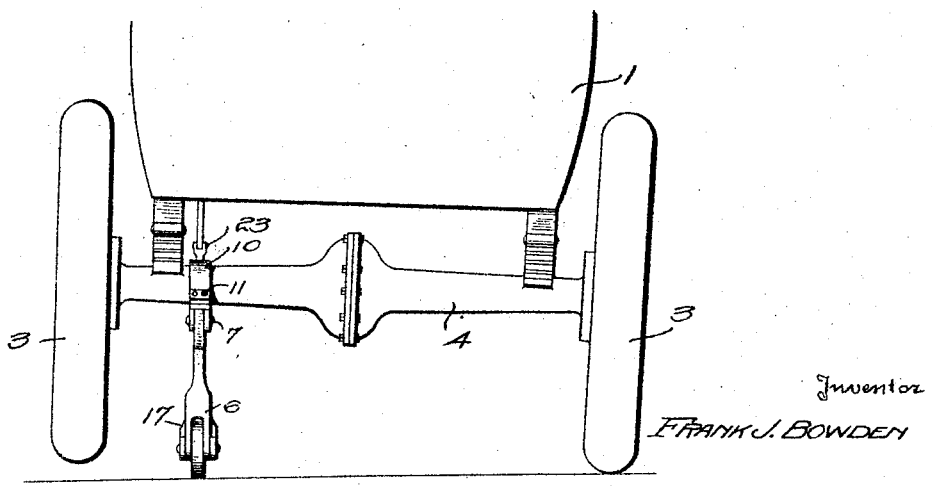

In the accompanying drawings, I have shown one embodiment of the invention. In this showing:

Figure 1 is a side elevation of a motor vehicle showing the invention applied,

Figure 2 is a rear view of a motor vehicle showing the jack in operative position, Figure 3 is a side elevation of the jack removed, Figure 4 is a rear view of the jack, Figure 5 is a detail sectional view on line 5—5 of Figure 3, Figure 6 is a similar view on line 6—6 of Figure 3, Figure 7 is a detail view of a portion of the operating mechanism, Figure 8 is a detail sectional view on line 8—8 of Figure 7, Figure 9 is an enlarged view of the locking mechanism, and, Figure 10 is a detail sectional view on line 10—10 of Figure 7.

Referring to the drawings, the reference numeral 1 designates a motor vehicle having front wheels 2 and rear wheels 3. The rear wheels are mounted on a rear axle 4. The vehicle is provided with front seat 5. The parts heretofore described are of the usual construction and form no part of the present invention, except in the combination claimed.

The locking mechanism forming the subject matter of the present invention consists of a jack comprising a standard or upright 6, of slightly greater length than the distance from the rear axle to the ground. This upright member is mounted on a pin 7, carried by a bracket 8. The bracket is provided with a semi-circular clip 9, adapted to co-act with a similar clip 10, to embrace the rear axle housing. The clips 9 and 10 are secured to each other by suitable fastening means 11. As shown, the upper end of the standard is provided with a flat face 12 which is adapted to engage the under side of the bracket 8 when the standard is in vertical position to form a substantial support for the axle of the vehicle.

The lower end of the standard is bifurcated, forming a pair of spaced arms 13. A roller 14 is received between these arms and is mounted on a pin 15, passing through the arms. The pin 15 also passes through arms 16, extending from a head 17 of a control rod 18. The control rod extends forwardly to a point beneath the driver's seat and is connected to an operating lever 19. As shown, the operating lever is pivotally mounted in a bracket 20 arranged on the under side of the floor 21 of the body of the vehicle and the upper end of the operating rod extends through a slot in the floor in the usual manner. The lower end of the operating rod is provided with a plurality of holes 22, suitably spaced from each other to permit adjustment of the control rod. The end of the control rod is adapted to receive a pin 23, which may be arranged in one of these openings. A quadrant 24 is secured to the bracket 20 and this quadrant is provided with spaced teeth 25. The control rod is provided with a central passage adapted to receive a locking lever 26. The lower end of the passage communicates with a recess 27, extending through one side of the operating lever and the locking lever is provided with an offset end 28 adapted to pass through this recess. The offset end is secured to a pawl 29, pivotally mounted on the operating lever, as at 30.

A handle 31 is secured to the upper end of the operating lever by means of a locking washer 32, which prevents removal of the handle. This handle is provided with a central passage 33 of greater diameter than the passage through the operating lever. A spring 34 is arranged therein and the upper end of this spring engages a shoulder 35 formed by an enlargement 36 of the locking lever to normally maintain the locking lever in raised position. The locking lever passes through a sleeve 37 which is retained in the handle by means of a washer 38 and the enlargement 36 receives suitable locking mechanism (not shown) whereby the locking lever is maintained in raised position. A key 39 may be inserted in the upper end of the enlargement for releasing the lock.

The operation of the device is as follows:

With the locking lever released, it may be lowered to raise the pawl 29 from the teeth 25 of the quadrant and permit movement of the operating lever. The operating lever is moved forwardly, forcing the control lever rearwardly and lowering the jack to the position shown in Figures 2 and 3 of the drawings. This raises one of the rear wheels from the ground and prevents the vehicle from being operated under its own power. When the jack is in operative position, the flat face 12 of the standard 6 engages the under side of bracket 8 to form a substantial support. By releasing the depressed locking lever 26 with the jack in operative position, the spring 34 moves the locking lever upwardly and causes the pawl 29 to engage one of the teeth 25 which prevents the jack from being moved to inoperative position until the proper key 39 is inserted in the lock.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

An attachment for motor vehicles comprising a pair of complementary members adapted to be secured around an axle of the vehicle to form a bracket, one of said members being provided with an integral longitudinal extension having a flat lower face arranged below the axle, a standard pivotally connected at its upper end to the end of said extension, a shaft secured in the opposite end of said standard, a wheel journalled on said shaft and adapted to contact with the ground when in operative position to raise a wheel of the vehicle, said shaft when in operative position being arranged directly below the pivot of said standard, said standard being provided at its upper end with a lateral offset having a flat upper face adapted to contact with the lower face of said extension when in operative position and extending there along at least to a point directly below the center of the axle, a rigid operating rod pivotally connected at one end to said shaft, and manually controlled means associated with the opposite end of said rod to prevent movement of the lower end of said standard from operative position.

In testimony whereof I affix my signature.

FRANK J. BOWDEN.